(12) United States Patent
Miyadai

(10) Patent No.: US 7,009,609 B2
(45) Date of Patent: Mar. 7, 2006

(54) METHOD, SYSTEM, AND SOFTWARE FOR AUTOMATED GENERATION OF GRAPHS FROM REPORT DATA

(75) Inventor: Isao Miyadai, Tokyo (JP)

(73) Assignee: BSP Inc., Tokyo (JP)

( * ) Notice: Subject to any disclaimer, the term of this patent is extended or adjusted under 35 U.S.C. 154(b) by 294 days.

(21) Appl. No.: 09/819,820

(22) Filed: Mar. 29, 2001

(65) Prior Publication Data

US 2002/0140699 A1 Oct. 3, 2002

Related U.S. Application Data

(60) Provisional application No. 60/257,105, filed on Dec. 22, 2000.

(51) Int. Cl.
G06T 11/20 (2006.01)

(52) U.S. Cl. ............. 345/440; 345/440.1; 345/440.2; 345/441

(58) Field of Classification Search ........... 345/440, 345/440.1, 440.2, 441
See application file for complete search history.

(56) References Cited

U.S. PATENT DOCUMENTS

| | | | |
|---|---|---|---|
| 5,317,686 A | 5/1994 | Salas et al. | |
| 5,452,409 A | 9/1995 | Smith | 345/440 |
| 5,461,708 A * | 10/1995 | Kahn | 345/440 |
| 5,485,564 A | 1/1996 | Miura | 345/440 |
| 5,581,678 A | 12/1996 | Kahn | |
| 5,611,034 A | 3/1997 | Makita | |
| 5,701,400 A * | 12/1997 | Amado | 706/45 |
| 5,727,161 A | 3/1998 | Purcell, Jr. | |
| 6,020,898 A | 2/2000 | Saito et al. | 345/440 |
| 6,571,285 B1 * | 5/2003 | Groath et al. | 709/223 |

FOREIGN PATENT DOCUMENTS

| | | |
|---|---|---|
| EP | 1 220 158 A3 | 7/2002 |
| JP | 5-334291 | 12/1993 |
| JP | 7-28817 | 1/1995 |
| JP | 7-44579 | 2/1995 |
| JP | 7-98707 | 4/1995 |
| JP | 10-207751 | 8/1998 |

* cited by examiner

Primary Examiner—Matthew C. Bella
Assistant Examiner—Tam Tran
(74) Attorney, Agent, or Firm—Foley & Lardner LLP

(57) ABSTRACT

A computer implemented method, software, and system for automatically generating a graph from report data includes identifying a report format as having at least one first group at a first level having at least one detail line with at least two data fields in each of the detail lines. The first group further includes either a vertical total for each of a plurality of the respective data fields in the first group or a horizontal total for each of a plurality of the respective detail lines, with each particular vertical total totaling with each particular horizontal total totaling each of the data fields for that particular detail line. A user input is indicative of one of the totals, and a graph is automatically generated using a predefined rule corresponding to the one of the totals indicated by the user input.

61 Claims, 11 Drawing Sheets

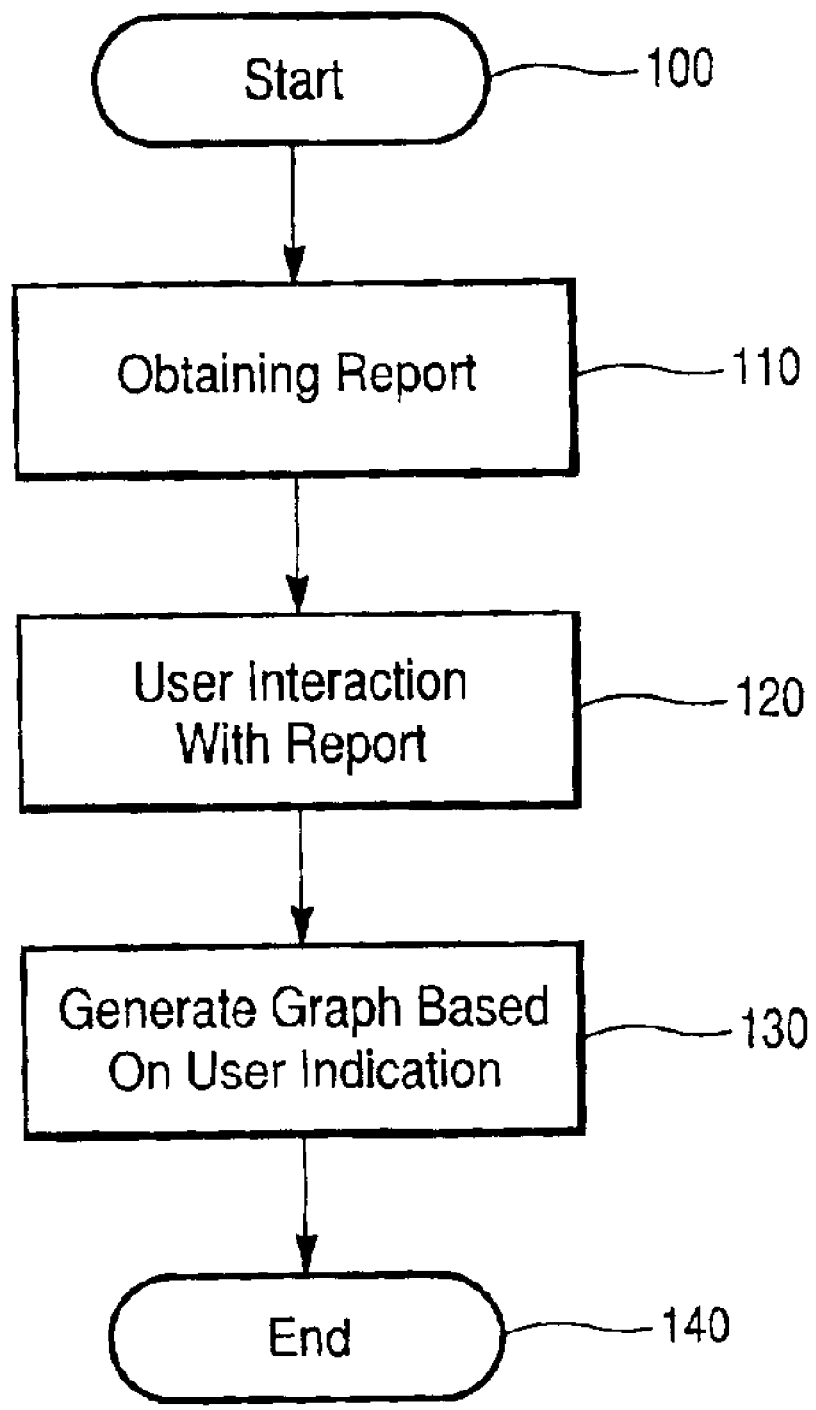

Fig. 2A

| Section | Product | Apr. | May | June | July | Aug. | Sept. | Total |
|---|---|---|---|---|---|---|---|---|
| Section - 1 | A-A | 1,000 | 1,200 | 900 | 1,500 | 750 | 2,300 | 7,650 |
|  | A-S | 800 | 900 | 1,100 | 1,200 | 900 | 1,800 | 6,700 |

Fig. 2B

| Section | Product | Apr. | May | June | July | Aug. | Sept. | Total |
|---|---|---|---|---|---|---|---|---|
| Section - 1 | A-A | 1,000 | 1,200 | 900 | 1,500 | 750 | 2,300 | 7,650 |
|  | A-S | 800 | 900 | 1,100 | 1,200 | 900 | 1,800 | 6,700 |
|  |  | 1,800 | 2,100 | 2,000 | 2,700 | 1,650 | 4,100 | 14,350 |
| Section - 2 | A-A | 800 | 2,000 | 1,000 | 1,300 | 600 | 1,900 | 7,600 |
|  | A-S | 1,000 | 1,300 | 900 | 1,200 | 1,000 | 2,100 | 7,500 |
|  | A-D | 200 | 250 | 300 | 150 | 200 | 500 | 1,600 |
|  | Total | 2,000 | 3,550 | 2,200 | 2,650 | 1,800 | 4,500 | 16,700 |
|  | Dept. Tot. | 3,800 | 5,650 | 4,200 | 5,350 | 3,450 | 8,600 | 31,050 |

Control break key

Total for each control break key

Fig. 6

| Products | Oct. | Nov. | Dec. | Total |
|---|---|---|---|---|
| AA | 1,000 | 1,000 | 1,000 | 3,000 |
| AB | 2,000 | 2,000 | 2,000 | 6,000 |
| AC | 3,000 | 3,000 | 3,000 | 9,000 |
| Total | 6,000 | 6,000 | 6,000 | 18,000 |

Sec. 1

203 203 203

204H — (Item Name, etc.)
201 — Detail Line
201 — Detail Line
201 — Detail Line
204T — Level 1 Total Line Title, Name, etc. — V Total Items (204) — X Total Item (206) — H Total Items (202)

Fig. 7

402H — Tokyo Sales Dept.

| Products | Oct. | Nov. | Dec. | Total |
|---|---|---|---|---|
| AA | 1,000 | 1,000 | 1,000 | 3,000 |
| AB | 2,000 | 2,000 | 2,000 | 6,000 |
| AC | 3,000 | 3,000 | 3,000 | 9,000 |
| Subtotal | 6,000 | 6,000 | 6,000 | 18,000 |
| AA | 1,000 | 1,000 | 1,000 | 3,000 |
| AB | 2,000 | 2,000 | 2,000 | 6,000 |
| Subtotal | 3,000 | 3,000 | 3,000 | 9,000 |
| AA | 1,000 | 1,000 | 1,000 | 3,000 |
| AC | 2,000 | 2,000 | 2,000 | 6,000 |
| Subtotal | 3,000 | 3,000 | 3,000 | 9,000 |
| Dept. Tot. | 12,000 | 12,000 | 12,000 | 36,000 |

Sec. 1 / 401H
Sec. 2 / 401H
Sec. 3 / 401H 203 203 203

(Title, etc.)
204H — (Item Name, etc.)
Detail Line
Detail Line
Detail Line
204T — Level 1 Total Line
Detail Line
Detail Line
Level 1 Total Line
Detail Line
Detail Line
205T — Level 1 Total Line Title, Name, etc. — V Total Items — X Total Item (206) — H Total Items

Fig. 9

Example of Report A
row number

| # | | | | | | | |
|---|---|---|---|---|---|---|---|
| 1 | Tokyo Sales Dept. | | | | | | |
| 2 | | Product | Oct. | Nov. | Dec. | Total | |
| 3 | Sec. 1 | AA | 1000 | 1000 | 1000 | 3000 | —904 |
| 4 | | AB | 2000 | 2000 | 2000 | 6000 | |
| 5 | | AC | 3000 | 3000 | 3000 | 9000 | —905 |
| 6 | | Subtotal | 6000 | 6000 | 6000 | 18000 | |
| 7 | Sec. 2 | AA | 1000 | 1000 | 1000 | 3000 | |
| 8 | | AB | 2000 | 2000 | 2000 | 6000 | |
| 9 | | Subtotal | 3000 | 3000 | 3000 | 9000 | |
| 10 | Sec. 3 | AA | 1000 | 1000 | 1000 | 3000 | |
| 11 | | AB | 2000 | 2000 | 2000 | 6000 | |
| 12 | | Subtotal | 3000 | 3000 | 3000 | 9000 | |
| 13 | | | | | | | |
| 14 | | Dept. Total | 12000 | 12000 | 12000 | 36000 | |
| 15 | | | | | | | |
| 16 | Yokohama Sales Dept. | | | | | | |
| 17 | | Product | Oct. | Nov. | Dec. | Total | |
| 18 | Sec. 1 | AA | 1000 | 1000 | 1000 | 3000 | |
| 19 | | AB | 2000 | 2000 | 2000 | 6000 | |
| 20 | | AC | 3000 | 3000 | 3000 | 9000 | |
| 21 | | Subtotal | 6000 | 6000 | 6000 | 18000 | |
| 22 | Sec. 2 | AA | 1000 | 1000 | 1000 | 3000 | |
| 23 | | AD | 2000 | 2000 | 2000 | 6000 | |
| 24 | | Subtotal | 3000 | 3000 | 3000 | 9000 | |
| 25 | | | | | | | |
| 26 | | Dept. Subtotal | 9000 | 9000 | 9000 | 27000 | |
| 27 | | | | | | | —902 |
| 28 | Osaka Sales Dept. | | | | | | |
| 29 | | Product | Oct. | Nov. | Dec. | Total | |
| 30 | Sec. 1 | AA | 1000 | 1000 | 1000 | 3000 | |
| 31 | | AB | 2000 | 2000 | 2000 | 6000 | |
| 32 | | AD | 3000 | 3000 | 3000 | 9000 | |
| 33 | | Subtotal | 6000 | 6000 | 6000 | 18000 | |
| 34 | Sec. 2 | AA | 2000 | 2000 | 2000 | 6000 | |
| 35 | | AC | 4000 | 4000 | 4000 | 12000 | |
| 36 | | Subtotal | 6000 | 6000 | 6000 | 18000 | |
| 37 | | | | | | | |
| 38 | | Dept. Subtotal | 12000 | 12000 | 12000 | 36000 | |
| 39 | | | | | | | |
| 40 | | Corporate Total | 33000 | 33000 | 33000 | 99000 | |

Blue color items are "V Total Items"
Red color items are "H Total Items"
Green color items are "X Total Items"

Fig. 10

Example of Report B — row number

1010

| Row | | | | |
|---|---|---|---|---|
| 1 | | | | |
| 2 | Sales (Oct 2000) | | | |
| 3 | | | | |
| 4 | Tokyo Sales Dept. | | | |
| 5 | | Product | Qty. | Amt. ($) |
| 6 | Sec. 1 | AA | 1000 | 10000 |
| 7 | | AB | 2000 | 25000 |
| 8 | | AC | 1500 | 30000 |
| 9 | | Subtotal | | 65000 |
| 10 | Sec. 2 | AA | 500 | 12000 |
| 11 | | AB | 800 | 24000 |
| 12 | | Subtotal | | 36000 |
| 13 | Sec. 3 | AA | 1100 | 30000 |
| 14 | | AC | 2000 | 40000 |
| 15 | | Subtotal | | 70000 |
| 16 | | | | |
| 17 | | Dept. Total | (1) | 171000 |
| 18 | | | | |
| 19 | Yokohama Sales Dept. | | | |
| 20 | | Product | Qty. | Amt. ($) |
| 21 | Sec. 1 | AA | 1500 | 10000 |
| 22 | | AB | 1000 | 30000 |
| 23 | | Subtotal | | 40000 |
| 24 | | AA | 1000 | 8000 |
| 25 | | AC | 2000 | 12000 |
| 26 | | Subtotal | | 20000 |
| 27 | | | | |
| 28 | | Dept. Total | (2) | 60000 |
| 29 | | | | |
| 30 | Osaka Sales Dept. | | | |
| 31 | | Product | Qty. | Amt. ($) |
| 32 | | | | |
| 33 | | | | |
| 34 | | | | |
| 35 | | | | |
| 36 | | | | |
| 37 | | | | |
| 38 | | | | |
| 39 | | | | |
| 40 | | | | |

1012 — To Fig. 10 cont. →

| | | | |
|---|---|---|---|
| Sales (Nov 2000) | | | |
| Tokyo Sales Dept. | | | |
| | Product | Qty. | Amt. ($) |
| Sec. 1 | AA | 1000 | 10000 |
| | AB | 2000 | 25000 |
| | AC | 1500 | 30000 |
| | AD | 1000 | 30000 |
| | Subtotal | | 95000 |
| Sec. 2 | AA | 500 | 12000 |
| | AB | 800 | 24000 |
| | AC | 800 | 20000 |
| | Subtotal | | 56000 |
| Sec. 3 | AA | 1100 | 30000 |
| | AB | 600 | 20000 |
| | AC | 2000 | 40000 |
| | Subtotal | | 90000 |
| | Dept. Total | (2) | 241000 |
| Yokohama Sales Dept. | | | |
| | Product | Qty. | Amt. ($) |
| Sec. 1 | AA | 1000 | 8000 |
| | AB | 1100 | 32000 |
| | AC | 1000 | 8000 |
| | Subtotal | | 48000 |
| Sec. 2 | AA | 1000 | 8000 |
| | AC | 2000 | 12000 |
| | Subtotal | | 20000 |
| | Dept. Total | (2) | 66000 |
| Osaka Sales Dept. | | | |
| | Product | Qty. | Amt. ($) |

← From Fig. 10

1014

Sales (Dec 2000)

Tokyo Sales Dept.

| | Product | Qty. | Amt. ($) |
|---|---|---|---|
| Sec. 1 | AA | 1200 | 14000 |
| | AB | 2200 | 24000 |
| | AD | 2000 | 40000 |
| | Subtotal | | 78000 |
| Sec. 2 | AA | 500 | 12000 |
| | AB | 800 | 24000 |
| | AC | 1000 | 10000 |
| | AD | 500 | 4000 |
| | Subtotal | | 50000 |
| Sec. 3 | AA | 1000 | 33000 |
| | AC | 1000 | 22000 |
| | Subtotal | | 55000 |
| | Dept. Total | (1) | 183000 |

1001 — Click Here!

1001G
Transition of Oct. - Dec. V Total Item (1)

Tokyo Sales Dept.
Tokyo
300000
200000 — 171000  241000  183000
100000
0
Oct   Nov   Dec Yokohama Sales Dept.

| | Product | Qty. | Amt. ($) |
|---|---|---|---|
| Sec. 1 | AA | 1400 | 1000 |
| | AB | 2000 | 40000 |
| | Subtotal | | 50000 |
| Sec. 2 | AA | 1200 | 10000 |
| | AC | 1500 | 8000 |
| | AD | 1000 | 12000 |
| | Subtotal | | 30000 |
| | Dept. Total | (2) | 80000 |

Osaka Sales Dept.
Product   Qty.   Amt. ($)

1002 — Click Here!

Transition of Oct. - Dec. V Total Item (2)

Yokohama Sales Dept.
Yokohama
100000
80000 — 60000  66000  80000
60000
40000
20000
0
Oct   Nov   Dec

1002G

← From Fig. 10

METHOD, SYSTEM, AND SOFTWARE FOR AUTOMATED GENERATION OF GRAPHS FROM REPORT DATA

CROSS-REFERENCE TO RELATED APPLICATION(S)

This application claims the benefit of priority under 35 U.S.C. §119(e) of provisional application Ser. No. 60/257,105, entitled "Method, System, and Software for Automated Generation of Graphs from Report Data," (Inventor: Isao Miyadai) filed on Dec. 22, 2000, the disclosure which is incorporated herein in its entirety.

BACKGROUND OF THE INVENTION

1. Field of the Invention

This invention relates generally to the field of software that automatically generates graphs from report data. More particularly, the present invention relates to automatically generating graphs by identifying regularities in reports and report data derived from reports.

2. Background of the Related Art

Reports output by application systems (hereinafter called "Reports") are repeatedly (for example, daily or monthly) delivered to a user. Therefore, the users have to read the data in Reports repeatedly, which is a repetitive burden for them. Furthermore, most of such Reports normally are comprised of characters and Figures, and generally do not contain visual images, such as graphs and charts that make a report easier to comprehend and use.

Currently, there are a variety of graph drawing tools available. With each of those tools, the user has to select the necessary data to arrange (or extract) them into a table, from which a graph may be drawn. A similar procedure is required in case of spreadsheet application software, such as, for example, MS-Excel. That is, the user of Reports often re-enters necessary data in MS-Excel, mostly manually, and creates or extracts data to form tables that are then used to draw graphs.

Reports contain, in addition to data of vital importance for the user, information like titles, headers, etc., that show attributes of Reports and/or impart organization to the reports. Reports delivered to the user normally comprise voluminous pages, from a few pages up to hundreds of pages, and it is troublesome and time-consuming to select or extract the necessary data (e.g. totals) from the Reports.

Therefore, known prior art systems generate graphs from tabular data or other data whose format (i.e., spreadsheets) cannot be easily used (without additional extraction or alteration steps) for automatically generating customized (or user definable) graphs for a user. In particular, there are no known prior art systems that identify and use the regularity of reports to enable a user to automatically generate graphs from report data, based on fields identified from the regularity of reports.

SUMMARY OF THE INVENTION

Therefore, it is a general object of the invention to alleviate the problems and shortcomings identified above and provide other advantages as will be apparent from the disclosure herein.

In one important aspect, the present invention provides a computer implemented method of automatically generating a graph from report data, the method including: identifying a report format as comprising at least one first group at a first level having at least one detail line with at least two data fields in each of the detail lines, wherein the first group further includes either a vertical total for each of a plurality of the respective data fields in the first group or a horizontal total for each of a plurality of the respective detail lines, with each particular vertical total totaling with each particular horizontal total totaling each of the data fields for that particular detail line; receiving a user input indicative of one of the totals; and generating a graph using a predefined rule corresponding to the one of the totals indicated by the user input.

In another aspect of the invention, the vertical totals are formed in a vertical total line.

In a further aspect of the present invention, the predefined rule corresponding to a particular one of the vertical totals includes using each different value that formed that particular vertical total to form a different feature in said graph.

In another aspect of the present invention, the predefined rule corresponding to particular one of the horizontal totals includes using each different value that formed that particular detail line total to form a different feature in said graph.

In one aspect of the invention, each different feature is a separate display component in said graph displayed on a graphical display.

In a further aspect of the invention both vertical totals and horizontal totals are included in the report.

In one aspect of the present invention, the report format further includes a cross total field that equals either the sum of the vertical totals or the sum of the horizontal totals.

In one aspect the present invention includes receiving a user input indicative of one cross total field; and generating a graph using a predefined rule corresponding to that one cross total field wherein the predefined rule corresponding to that one cross total field includes forming a different feature in said graph corresponding to either each vertical total or each horizontal total that formed said cross total field.

In a further aspect of the present invention, the predefined rule corresponding to that one cross total field includes forming a first and a second graphs, with a different feature in said first graph corresponding to each vertical total that formed said cross total field and with a different feature in said second graph corresponding to each horizontal total that formed said cross total field.

In one aspect of the present invention, the report format is hierarchical and further includes a second group at a second level, each second group including one or more first groups, the second group including second group vertical totals for each of a plurality of the data fields of the first group, with each second group vertical total for a data field aggregating all vertical totals for that data field for each first group in the second group.

In one aspect of the present invention, the second group vertical totals are formed in a line.

A further aspect of the present invention includes receiving a user input indicative of one of the second group vertical totals; and generating a graph using a predefined rule corresponding to that one of the second group vertical totals wherein the predefined rule corresponding to a particular one of the second group vertical totals includes using each different first group vertical total that formed that second group vertical total to form a separate feature on said graph.

In a further aspect of the present invention each second group comprises at least two first groups.

In yet another aspect of the present invention, the hierarchical report format further includes a third group at a third level, each third group including one or more second groups, the third group including respective third group vertical totals for each of a plurality of the second group vertical totals for a data field, with each third group vertical total aggregating all second group totals for that data field for each second group in the third group.

In one aspect of the present invention, the received user input includes clicking on a total in a total area that is of a different color than other areas.

In another aspect of the invention, each of a plurality of the different features in said graph is linked to the corresponding different value used to form that feature, and wherein clicking on a feature displays the linked corresponding different value.

One aspect of the present invention provides that when a feature designation is received from a user, the report page containing the different value used to form that feature is displayed.

In a further aspect of the present invention, when the report page is displayed after receiving a designation of a feature, at least one value used to form the feature is displayed in a different manner relative to the other values on the report page.

In one aspect of the present invention, when a feature in said graph is designated, a report page number containing the value used to form the designated feature is displayed.

In another aspect of the present invention, the report format is hierarchical and further includes a second group at a second level, each second group including one or more first groups, the second group including second group vertical totals for each of a plurality of the data fields of the first group, with each second group vertical total for a data field aggregating all vertical totals for that data field for each first group in the second group, wherein the column location of vertical totals determines the column location of the data fields of all detail lines.

In one aspect, the present invention provides that predetermined control break characters define the location of the first and any other subsequent hierarchical groups.

In another aspect, the present invention provides for highlighting or changing in color the one of the totals indicated by the user input; and highlighting or changing in color data components that comprise the one of the totals indicated by the user input.

In a further aspect, the present invention provides for extracting corresponding data for one of the totals from a series of reports indicated by a user, and generating a graph displaying a different feature for each of the extracted corresponding data wherein the series of reports represents a time series of a particular report.

In one aspect, the present invention provides that in a computer display system that displays a graph corresponding to report data, a method of displaying graph components includes :generating graph components corresponding to an identified report format having plural detail lines each having plural data fields and having either respective vertical total fields for each data field that totals that data field's values in each of the detail lines or respective horizontal total fields for each detail line that totals all the data fields in one detail line; highlighting either the vertical total fields or the horizontal total fields; accepting user input only in the highlighted vertical total fields or the horizontal total fields; and generating a graph based on user input in one of the highlighted vertical total fields or the horizontal total fields.

In another important aspect, the present invention provides a computer readable data storage medium having program code recorded thereon for automatically generating a graph from report data, the program code including: first program code that identifies a report format as comprising at least one first group at a first level having at least one detail line with at least two data fields in each of the detail lines, wherein the first group further includes either a vertical total line for each of a plurality of the respective data fields in the first group or a horizontal total for each of the plurality of the detail lines, with each particular horizontal total totaling each of the data fields for that particular detail line; second program code that receives user input indicative of one of the totals; and third program code that generates a graph using a predetermined rule corresponding to the one of the totals indicated by the user input.

In yet another important aspect, the present invention provides a system for automatically generating a graph from report data, the system including: a report unit that identifies a report format as comprising at least one first group at a first level having at least one detail line with at least two data fields in each of the detail lines, wherein the first group further includes either a vertical total line for each of a plurality of the respective data fields in the first group or a horizontal total for each of the plurality of the detail lines, with each particular horizontal total totaling each of the data fields for that particular detail line; a user interaction unit that receives a user input indicative of one of the total; and a graph generator that generates a graph by using a predefined rule corresponding to one of the totals indicated by the user input.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

FIG. 1 is a high level flowchart that illustrates one preferred embodiment of the present invention.

FIGS. 2A and 2B are diagrams illustrating report formats according to the present invention.

FIGS. 6–8 are diagrams that illustrate one preferred embodiment of the present invention.

FIG. 10 is a diagram illustrating one example of a time-series graph created in accordance with the present invention.

DESCRIPTION OF THE PREFERRED EMBODIMENT(S)

Figure 3A:
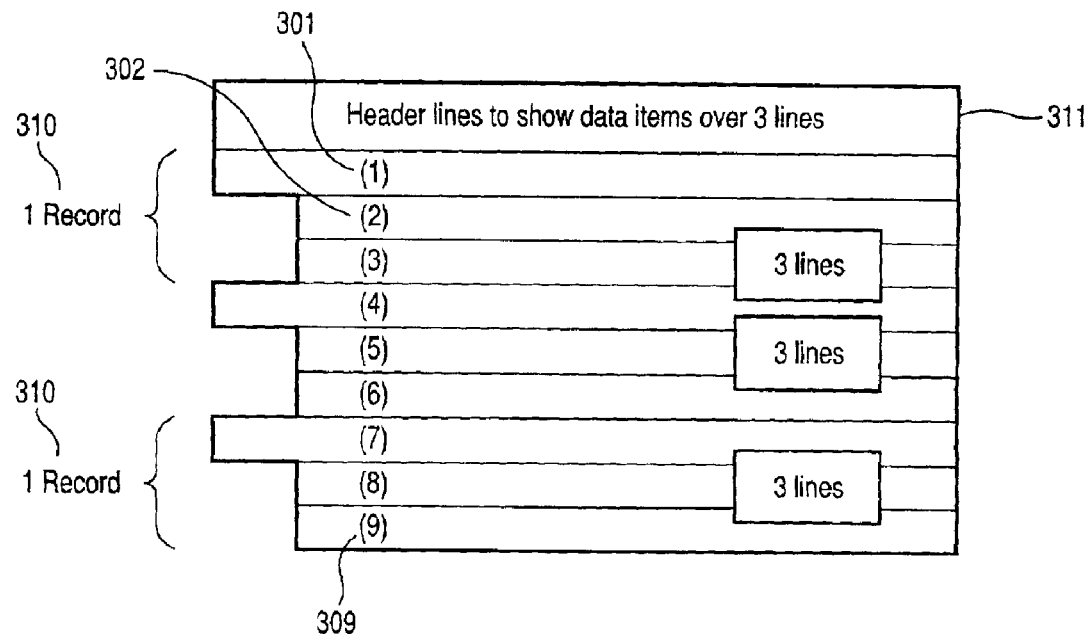
FIGS. 3A–3D are diagrams that illustrate the normalization of report formats according to the present invention.

FIG. 1 is a flowchart that discloses the high level steps of a computer implemented report data automated graph generation process according to the present invention.

The report-data graph generation process according to the present invention begins at step 100. In step 110, the report data that is used as the basis of the graphs generated according to the present invention is obtained for a user. In the preferred embodiment, the report data is obtained as electronic data, although one skilled in the art would recognize that the data could be obtained in any format (for example, on paper) from which it could be converted into electronic data. For example, a paper report could be scanned in or data entry could be performed to enter the relevant data contained in the paper report. The data for a report could also be contained in one or more databases such that a reporting application could interactively generate the report. Alternatively a report application could generate the data using live data (i.e., data that may be generated or altered in real-time) available from one or more data sources.

Once the data is obtained in electronic format, a report format is identified that takes advantage of the regularity (in particular with respect to the total/total fields) in the report as discussed in the following paragraphs.

Regularity of Reports

Reports created by applications are structured with a set of processing logic that is repeated. Typically, reports created by the same application system are output using the same report format, although the volume of data may differ and the values computed and shown are different.

In reports comprising numerical values, several control break keys (or control characters corresponding thereto) are defined, and a set of data is calculated using the defined control break keys. The result of the calculation is shown as total values in the report. Likewise, even in reports including non-numeric values, an average or total value may be computed on one or more total lines based on certain criteria. For example, a weather report classifying the daily weather as "good," "fair," and "poor," may compute a value for a week (or a month) based on certain defined criteria. One example of such a criteria may be that a week's weather is classified based on the classification that occurs most frequently during the days of that week. Therefore, if the weather is classified as "good" on four days of the week, the weekly weather may be classified as "good."

Generally, Reports include multiple control break keys, with the control break keys defined with hierarchical attributes.

Therefore, reports created by given application programs have certain regularities and are repeatedly output in the same report formats with different daily or monthly (or other periodic) data. Important elements of this regularity that are identified and used by the present invention are discussed next.

Elements of the Total (and Definition of Detail Line)

In Reports used as examples by the present invention, the report is organized by detail lines, with each detail line containing one or more data fields. As shown in FIG. 2A, two detail lines 201 are shown for two different products A—A and A-S, respectively. Each of these detail lines 201 contains data fields 203 corresponding to the six months April-September, for example, for a six month sales report. In addition, there is a horizontal total data item 202 for each detail line 201 that totals each of the data fields for that detail line 201. Therefore, for example, for Section 1 in the Figure, the respective horizontal total data item 202 holds the sum of the data fields 203 for the particular detail line 201 corresponding to the products A—A and A-S, respectively, as shown in FIG. 2A. In the preferred embodiment, no separate control break key (or character) is needed to identify the horizontal total data items 202, since these can be easily identified, for example, by their position within a detail line. That is, in one embodiment, the column positions (for example, columns 71–80) within a detail line 201 (for example, having 80 or 133 columns or character positions) can be used to identify the horizontal total data items 202.

In addition to the horizontal total data items 202, the report typically contains one or more vertical total data items, such as the vertical total data items 204 shown in FIG. 2B. Therefore, the vertical total data item 204 contains the sum of all the values of that data item for all detail lines 201 that belong to a first hierarchical group. Therefore, the vertical total data item 204 for April for Section 1 (corresponding to an instance of a first hierarchical group) contains the sum of the April data fields 203 for each of the detail lines 201 that belong to a first group, i.e., 1000 and 800 ("Sections in FIG. 2B corresponds to a first hierarchical group"). Likewise, the vertical total data item 204 for May contains 2100 which is the sum of 1200 and 900 that are the May values for that data item 203 in the detail lines 201 that make up Section 1. Therefore, the vertical total data item 204 for Section 1 for a month comprises the sum of all the corresponding data items 203 for that month for each of the detail lines 201 for Section 1(i.e., 1800 for April). As seen in FIG. 2B, Section 1 contains detail lines 201 corresponding to products A—A and A-S. Section 2 (another instance of the first hierarchical group) contains detail lines 201 for three products A—A, A-S, and A-D. Therefore, the vertical total data items 204 for Section 2 includes corresponding data items 203 (April-September) for each of the three detail lines 201 for Section 2. That is, the vertical total data items 204 for Section 2 contain 2000 for April, 3550 for May, 2200 for June and so on.

Furthermore, as shown in FIG. 2B, in a preferred tabular arrangement, each of the vertical total data items 204 are arranged along a horizontal line 204T, preferably, at the end of each instance of a first hierarchical group. In addition, in a preferred embodiment, each report is arranged so that there is a header line 204H that identifies each of the data items 203 in each of the detail lines 201 and is typically arranged before the detail lines 201 that comprise the first instance of the first hierarchical group.

As shown in FIG. 2B, the vertical total data items 204 for the different sections may be based on a variable number of detail lines 201. For example, for Section 1, the vertical total data items 204 aggregate respective values from two detail lines 201 whereas, for Section 2, the vertical total data items 204 aggregate respective values from three detail lines 201. Accordingly, a control break key (or character, word or other convenient designation) has to be provided in the report data to identify the location of the vertical total data items 204 in their horizontal line 204T. For example, a first control break key (or character) or even a label such as "Section" or "Total" can be used to identify the location of the vertical total data fields 204 (in a horizontal line 204T) for a first group such as the "Section 1" shown in FIG. 2B. Such a control break key should be provided, preferably, at the end of all the detail lines 201 and any horizontal line 204T (containing vertical total data items 204) that make up an instance of the first group.

In addition to the vertical total data items 204 (and a corresponding horizontal line 204T) for one group, the present invention provides that a hierarchy of groups (as described further herein with reference to FIG. 4) can be represented in the reports such that all the detail lines 201 corresponding to one or more first groups 401 are aggregated to form a second group 402. Therefore, a second group vertical total data item 205 aggregates all the vertical totals for that data field 203 in each first group 401 instance that makes up the second group 402. The second group vertical total data items 205 are preferably arranged on a horizontal line 205T that contains all the vertical total data items 205 for a second group 402 instance. For example, with reference to FIG. 2B, the April second group vertical total data item 205 contains a value of 3800 that comprises the aggregation of the vertical total items 204 for April of 1800 and 2000 (corresponding to Section 1 and Section 2, respectively) to obtain a value of 3800. The hierarchy of group levels are also separately illustrated further herein with respect to FIG. 4.

Figure 4:
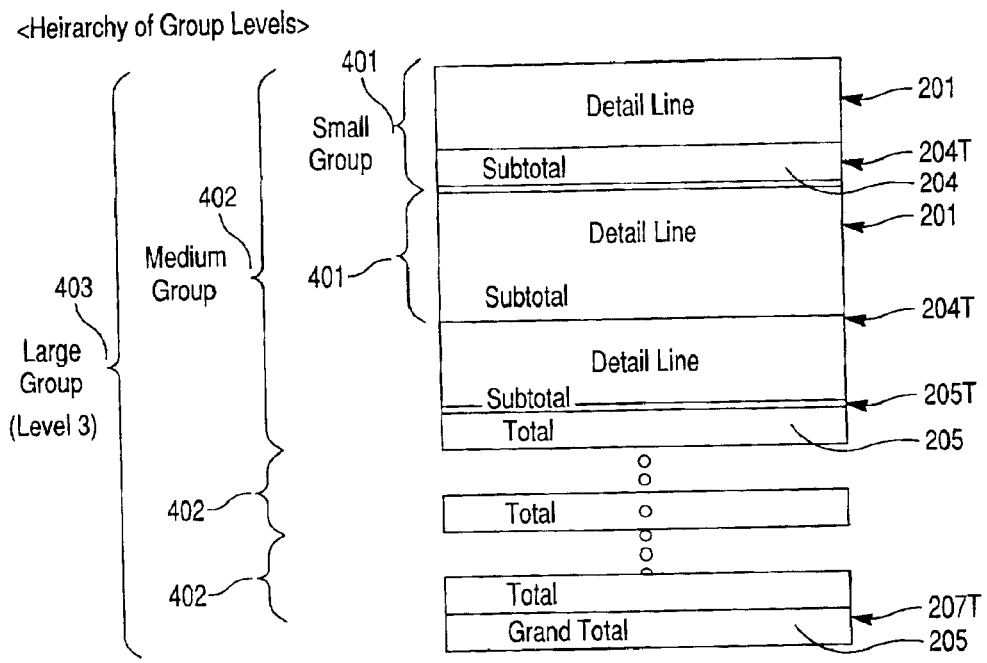
FIG. 4 is a diagram illustrating the hierarchy of group levels according to the present invention.

As illustrated in FIGS. 2B and 4, first group 401 instances corresponding to the "Sections" are aggregated to form vertical total data items 205 for a second group 402 instance corresponding to "Department." In FIG. 2B, vertical total lines 204T corresponding to the two first groups, Section 1 and Section 2, are aggregated to form the vertical total data items 205 corresponding to a second group ("Departments"). Likewise, since a variable number of first groups 401 can be used to form each second group 402, a control break key (or character) may be required to identify the locations of the second groups. In one embodiment, for example, the label "Department" or "Dept. Total" can be used to identify the locations of the vertical total data items 205 corresponding to the second groups. Further details of the hierarchy of groups and the normalization of data records as horizontal detail lines in a table format usable by the present invention is discussed further herein in the section entitled "Normalization of Reports," and "Hierarchy of Group Levels."

Once the regularity of report data can be identified as discussed above, the present invention provides that the user interaction with the report data can be processed. In step 120 (refer to FIG. 1), the user interacts with the report data so that the user can provide an indication selecting one or more of the fields in the report data. For example, the report data can be displayed on a computer display so that the user can make a selection of one or more of the fields of the report displayed on the computer display. In a preferred embodiment, the user indicates a field by clicking on the field by using a pointing device such as a mouse. However, any other indicating means, such as, touch, voice activation, wireless activation, etc., are also contemplated by the present invention, as long as the fields selected by a user can be identified. In one alternative, the field preferences of one or more users can be stored in computer files so that the user selections can be determined with reference to these computer files.

In one embodiment, the fields that are selectable by a user can be limited such that, for example, only total fields can be selected by a user. Furthermore, security or other requirements can restrict which fields can be displayed and selected by a user. In one aspect of the invention, such limitations on fields that can be selected by a user can be indicated on the displayed report, for example, by coloring or highlighting selectable fields.

Once the user's indication of one or more of the fields of the report format identified according to the present invention is received, step 130 generates a graph corresponding to the user's selection of particular fields by using predefined rules associated with those particular fields. Examples of such a process of automated graph creation and the exemplary rules associated with one or more of the totals that may be selected by a user are discussed herein in the following paragraphs.

Graph Creation

The present invention utilizes the above discussed regularity of Reports, to create various graphs from the Reports with very simple operations.

For example, when the user designates the total value (219 or 220 in FIG. 2B) for one of the lines 204T corresponding to the vertical total data items 204 of Section 1 (as shown in FIG. 2B), a predefined rule causes the breakdown of the six months' total of Section 1 by the month to be illustrated in a graph. Each feature may be distinguished within the graph from other features in some manner, such as by color, cross-hatching, shading, or any other convenient method, and an adjacent table may be provided showing the link between the data item and the color, shading, etc., representing it. In other words a graph is formed, with each data item that was used to calculate the total designated by the user, displayed as a graph component or feature in the graph. For example, if element 219 is designated by the user, then a graph is formed according to the rule with a separate graph feature for the month values 1800, 2100, 2000, 2700, 1650, and 4100. Likewise, if the user designates the vertical total in the first section for the month of April, then a graph is created which has a graph feature for each item that was used to create that total, i.e., 1000 and 800.

The types of graphs that may be displayed include bar graphs, pie charts, and any other graph where each graphed data item can be displayed as a display component or feature (bar, pie chart component, etc.) in the graph. For example, the relative magnitudes of multiple data items may be shown in a bar chart, while the proportion of data items relative to a whole may be better displayed in a pie chart. In such graphs, a graphed data item is displayed as a display component or feature, such as a bar in a bar chart or as a slice in a pie chart. However, such display components could also include different colors or other display or multimedia features (blinking display, etc.) as long as the display component is correlated to the data item displayed (for example, all displayed data items above or below a certain threshold are displayed in one color or are made to blink). In addition, one skilled in the art would recognize that other such graphs may be used to display the graphed data items identified according to the normalized report structure and rules of the present invention.

If the user designates the vertical total data item 204 for the data Field 203 for August for Section 1 (FIG. 2B), another predefined rule causes the breakdown of August sales for Section 1, by product, to be shown in a graph i.e., 750 and 900 are used as data items in the graph. Likewise, if the user designates the vertical total data item 204 for July for Section 2, the breakdown of July sales for Section 2, by product, can be shown in a graph i.e., 1300, 1200, and 150 are used as data items in the graph.

Further, if the user designates the vertical total data item 205 for a second level group 402, for example, the vertical total data item 205 corresponding to the department total line for June, a graph is generated that shows the breakdown of June numbers by Section (i.e., the first level group). That is, 2000 (for Section 1) and 2200 (for Section 2) are used as data items to create features for a graph.

If the user designates the data item 206, which is a crossed total data item of the "department total" line 205T and the "horizontal total" column 202, both the breakdown of the department grand total by the month and the breakdown by the Sections are shown in two graphs. Alternatively, the user can designate either of the graphs. In the same manner, by designating the items where the total line and totals column intersects (or cross), one or both of the two different graphs can be created. That is, in FIG. 2B, if the cross total data item 206 is selected one or both of the following two graphs may be generated according to the predefined rules of the present invention: (I) vertical total data items 205 for each month (April-3800, May-5650, June-4200 and so on) are used as data items to form features in a graph; and (II) horizontal total items 219 and 220 for the horizontal total column 202 (i.e., 14,350 for Section 1 and 16,700 for Section 2) are used as data items to form features in a graph.

It should be noted that the preferred embodiments of the present invention uses predefined rules to generate graphs based on user selections of specific data items in a report. However, in alternate embodiments, the user may also be provided an option or choice to select among various graphs that may be generated when a user selects a particular data item. One such alternate embodiment, discussed further herein, may allow the user to select between a graph based on data from a current report and a time series graph that uses data from a series of reports (for example, covering different time periods).

When Reports are created and stored by time-series (i.e., similar reports over a predetermined or varying time period), the present invention provides that a time series graph that shows time series data can be created. Such a time series graph, extracts the corresponding data, from a series of Reports that are stored or accessible to the automated report based graph generation process according to the present invention. Therefore, for example, a user viewing a monthly report can automatically generate (with, for example, a mouse click), a graph showing the transition of the sales for a certain period, i.e., for a certain fiscal year or half a year period, or a graph showing the current data in comparison with that of a previous year or period.

In one embodiment, the user may be able to select one of the total fields (as discussed earlier) and either select a breakdown graph based on the current report or request a time series graph that presents a graph using data from prior reports for a selectable time period. Such a choice can be implemented, in one embodiment, by providing the user with a pop-up menu to select a total field that offers the user the option of requesting a graph based on the time series sequence of reports rather than just the current report and the period for the time series graph. Alternatively, the time series graphs may be requested by clicking a right mouse button, in a setup where clicking on the left mouse button generates a graph based on the current report (or vice versa). A variety of other control mechanisms may be used to activate such a time series graph, as is well known to one of ordinary skill in the art.

Normalization of Reports

The source data for creating Reports are normally stored in data files which are processed by application systems. These data files comprise data records with the Reports being a group of compiled data records formatted in an easy-to read and easy-to understand format for the users.

Normally one data record is formatted in one detail line in the Reports by the application program. However, sometimes one record is formatted over multiple detail lines when the number of data items or the data length exceeds the predefined line size. Alternatively, sometimes each data item of one data record is formatted on its own line, so one record is displayed over multiple lines, like in financial reports, instead of being formatted in a single horizontal detail line. Thus, such reports can also be formatted in several different ways (as discussed further herein). The present invention provides that the different formats can be processed in the same manner as if the data records were the same, by normalizing the Report formats.

Figure 3B:
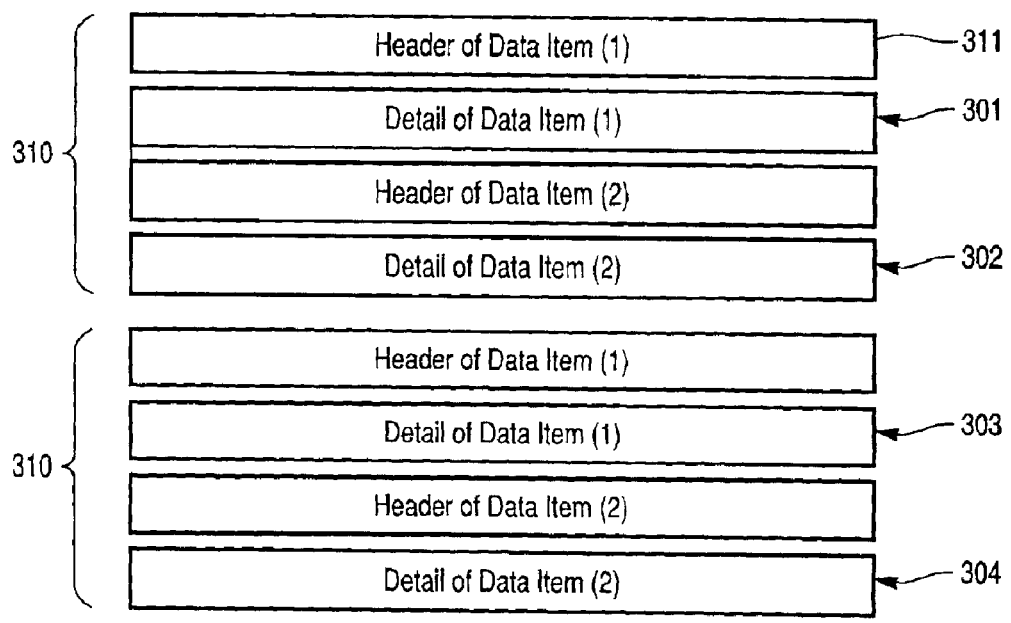
Figure 3C:
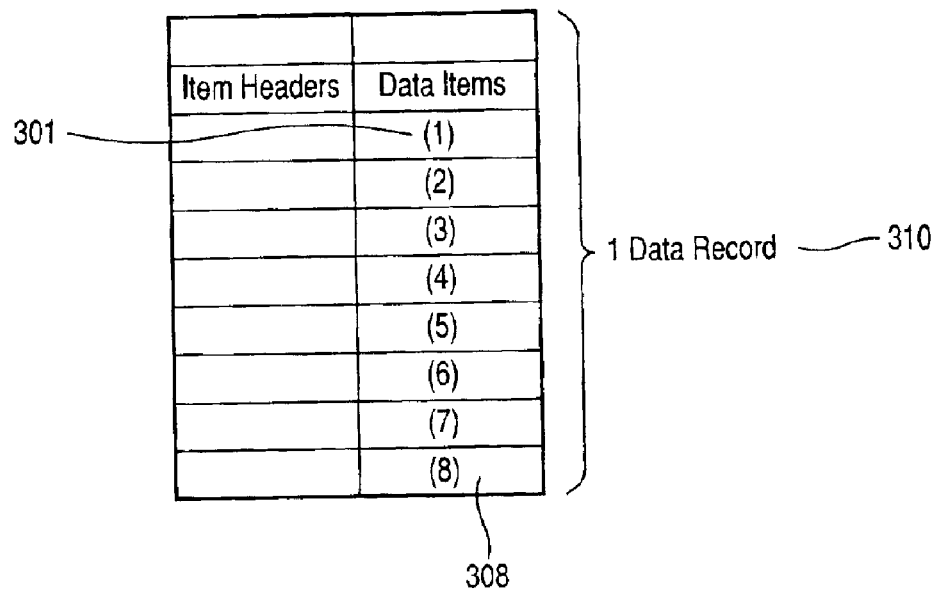

For example, Reports can be output in several formats as shown in FIGS. 3A–3C. For example, FIG. 3A shows a first format <format 1> in which each data record 310 is format-ted over multiple lines, with a header 311 separately formatted over multiple lines once per page or screen. Therefore, data items 301–303 form a first data record 310, while data items 304–306 form a second data record 310 and so on.

FIG. 3B shows a second format <format 2> in which one data record is formatted over multiple lines, with a combination of intermixed header lines and detail lines. The data items 301–302 make a first data record 310, while the data items 303–304 make a second data record 310 and so on.

FIG. 3C shows a third format <format 3> in which one data record 310 is formatted vertically with the data items 301–309 being formatted vertically on separate lines.

The normalization process of the present invention provides that all these three different formats (for example) can be processed in the same manner by logically rearranging based on normalization rules the data items in a data record (or a detail line) so that they are arranged in the same manner for processing in accordance with the present invention. In a preferred embodiment, the present invention normalizes the data records in a logically tabular format with each data record arranged as a horizontal detail line (containing all the data items in a data record) in the tabular format with additional header lines and total having data items corresponding to data items in the detail lines.

Figure 3D:
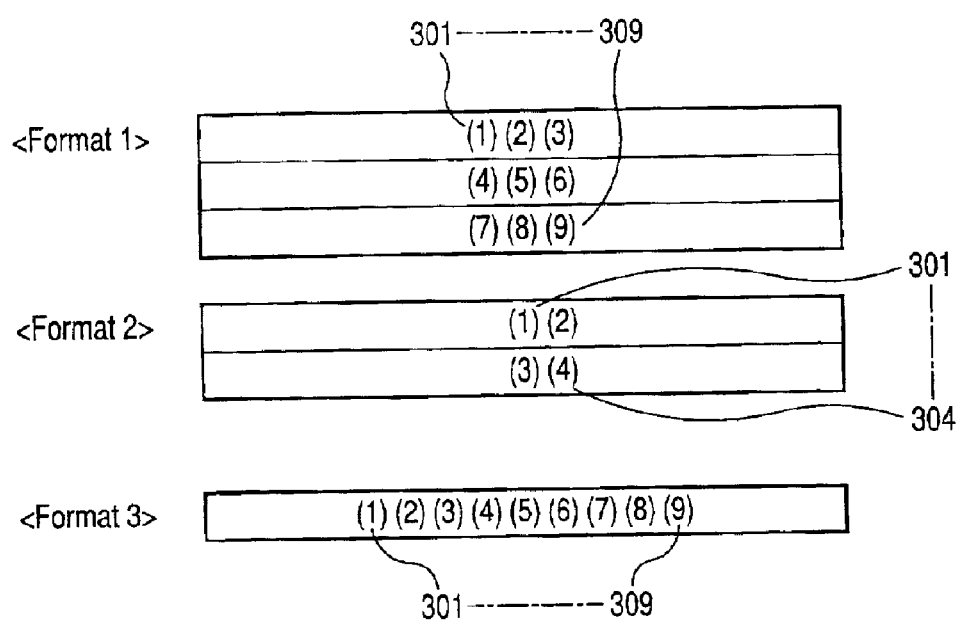

With reference to FIG. 3D, a normalization of <format 1>, corresponds to a report format having data items over multiple detail lines (FIG. 3A). Data items 301–303 that constitute one data record, are aligned horizontally. Likewise, data items 304–306 and 307–309 are also aligned horizontally since they each correspond to one data record.

In a normalization of <format 2>, corresponding to one data record formatted over multiple lines with mixed header and detail lines (FIG. 3B), the data items 301–302 and 303–304, which each constitute one respective data record, are aligned horizontally. Similarly, in a normalization of <format 3>, the data items of one data record 301–309 (derived from the data record 310 shown in FIG. 3C) are aligned horizontally as one data record (as shown in FIG. 3D).

Hierarchy of Group Levels

Another important aspect of the present invention uses the fact that Reports are often laid out with a hierarchical structure. As shown in FIG. 4, the present invention takes advantage of this hierarchical structure to automatically generate graphs by using rules that are tied to the hierarchical structure, as discussed earlier herein. Therefore, the present invention recognizes groups at various levels such that groups at one level (small groups) are aggregated to form groups at a higher level (medium groups). The medium groups are then aggregated to form groups at a higher level (Large groups).

Therefore, as shown in FIG. 4, the small groups (level 1) 401 comprise the detail lines 201 with each small group having a line that contains the vertical total data items 204. One or more of these small groups 401 are aggregated to form medium groups (level 2) 402 each of which has at least one vertical total line containing vertical total data items 205 that aggregates the corresponding vertical total data items 204 from each of the small groups 401 that make up a medium group 402. One or more medium groups 402 are aggregated to form a large group (level 3) 403 which contains a grand total line 207T having vertical grand total data items 207 that aggregate the corresponding vertical total data items from the medium groups 402 that make up a large group 403. The present invention takes advantage of the hierarchical structure of the report data normalized and identified by the present invention. Specific rules are associated with the hierarchical structure to generate graphs based on user selections of data items in the different groups of the hierarchical structure identified according to the present invention.

One Preferred Embodiment of the Present Invention

Figure 5:
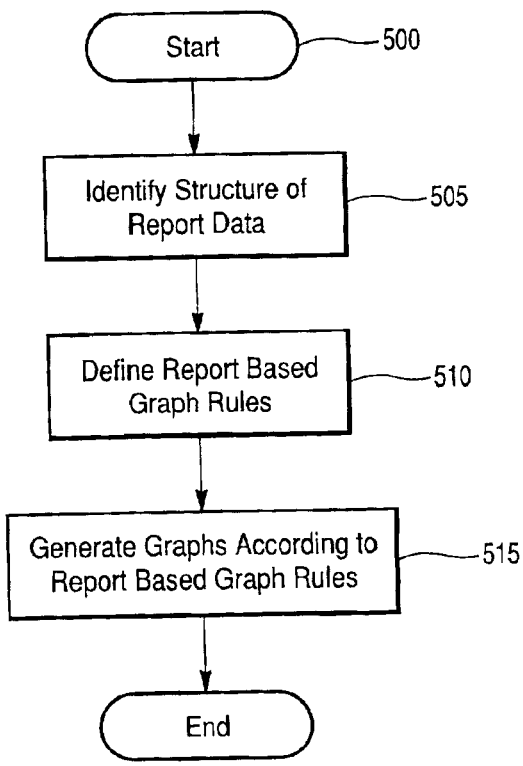
FIG. 5 is a flowchart illustrating the high level steps of the report data based graph generation according to one preferred embodiment of the present invention.

One preferred embodiment of the present invention will now be described with reference to FIGS. 5–10. FIG. 5 describes the high level steps of the report data based graph generation process according to one preferred embodiment of the present invention.

In step 505, the structure of the application reports is identified so that the graph creation process according to the present invention is facilitated. Normally application reports output by a computer have certain structures, and in this preferred embodiment, these structures are identified using simple rules as discussed further herein.

1.1 Level 1 Data Group

With reference to FIG. 6, Reports are structured with a combination of multiple hierarchical data groups. One data group 401 (see FIG. 4 or FIG. 8) comprises a combination of multiple Detail Lines 201 of multiple data items 203, and a Total Line 204T that comprises Vertical Total Items 204 totaling multiple numerical items from respective detail line 201. The data group defined in the lowest hierarchical level is called "Level 1 Data Group."

(1) Definition of "Detail Line" 201

Detail Lines are the "Lines" where multiple detail data items 203 are aligned horizontally.

(2) Definition of "Table"

"Table" comprises multiple Detail Lines 201 each having data items 203 of character strings aligned horizontally. Each Table can have either a single or multiple Detail Lines 201.

(3) Definition of the "Total Lines"

At the end of a "Table," there is a "line" 204T that shows the total values of data items 204 in the same column position of the "Table." Referring to FIG. 6, each Detail Line 201 comprises data of each product, as an example, and at the end of the "Table", there is a "line" 204T that shows the total value of Section 1, and this line is called "Level 1 Total Line" 204T.

(4) Definition of the "Total Item"

Within the "Detail Line" there may be a data item that represents the total of the numerical data items of that line, and it is called a Horizontal Total Item 202. Such a Total Item 202 may appear more than once in a "Detail Line" 201.

(5) Identification of "Table", "line" and "data item"

In a "Table," there may be character-string that shows the title of "Table," and there are character-strings to represent the names of each line in the "Table," and other character-strings that represent the names of each data item, displayed in the lines preceding "Table" or in the Detail Lines in "Table" (see, for example, header line 204H that contains a description of each data item 203 in a detail line 201).

(6) Definition of "Level 1 Data Group" 401

The minimum unit of "Table," including the title, names of lines and names of data items, is called "Level 1 Data Group".

(7) Definition of "V Total Item" 204

The numerical data items, in the Total Line 204T, that represent the total values of the data items 203 in multiple Detail Lines, 201 are called "V Total Items 204 (or vertical data item totals). Multiple "V Total Items" 204 can reside in a single Total Line 204T.

(8) Definition of "H Total Item" 202

The numerical data items that represent the total value of the data items 203 within the detail line 201 as defined in (4) above, i.e., the Total Items of the Detail Lines, are called "H Total Items" 202 (or horizontal data item totals). Multiple "H Total Items" 202 can reside in a single line (although only one per detail line 201 is shown in FIG. 6).

(9) Definition of "X Total Item" 206

The numerical data item 206 representing the total value of the data items in "Total Line" 204T, i.e., the Total Item of a Total Line, is called "X Total Item" 206 (or total of the horizontal Total Items and of the vertical Total Items). In other words, "X Total Item" 206 is a "V Total Item" 204 and an "H Total Item" 202 at the same time.

1.2 Level 2 Data Group

Figure 8:
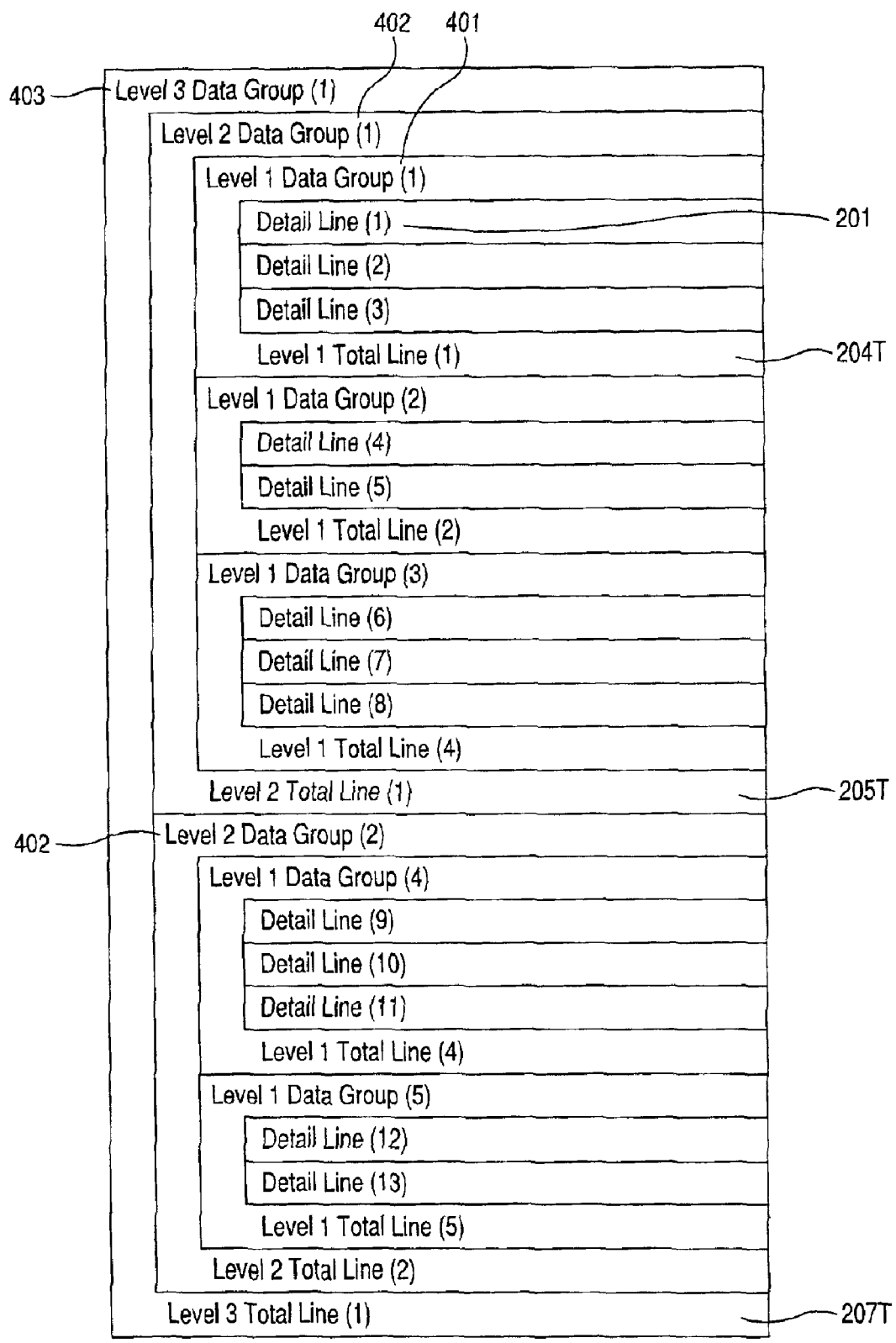

With reference to FIGS. 7 and 8, as explained above, Reports are structured with a combination of multiple hierarchical data groups (401, 402, 403, etc.). The lowest level in the structured data group is called "Level 1 Data Group" 401, and the one level above it is called "Level 2 Data Group" 402.

(1) Name of the Data Group

The above shown "Level 1 Data Group" 401 is sometimes repeatedly displayed in the Report. In such a case, character-strings that represent the title or names for "Level 1 Data Group" 401 H are generally displayed within the line preceding multiple "Tables", or in respective lines within "Level 1 Data Groups" 401.

(2) Definition of Level 2 Total Line

A "line" 205T that shows the total value of respective "Level 1 Total Line" 204T of each of repeatedly displayed "Level 1 Data groups" 401 may be displayed at the end of repeated "Level 1 Data Groups." For example, the Total Lines of Section Tables, that is total data of respective months, are displayed by the unit of a department. This line is called "Level 2 Total Line" 205T.

(3) Definition of Level 2 Data Group

A group comprising the above multiple "Level 1 Data Groups" 401 together with a line 402H that shows the title and a Total Line called "Level 2 Total Line" 205T is defined as a "Level 2 Data group" 402.

(4) Definition of V Total Item and X Total Item

The numerical data item 206 that represents the total value of "Level 2 Total Line" 205T is also called as "X Total Item," i.e., the Total Item of "V Total Item" 205 and "H Total Items" 202 at the same time, as defined before.

1.3 Hierarchy of Data Groups (1) Definition of Level 3 Total Line

As shown in FIG. 8, in Reports, "Level 2 Data group" 402 may be displayed repeatedly. In this case, a line may be defined that represents the total value, calculating "Level 2 Total Lines" 205T in multiple "Level 2 Data groups," and this line is called "Level 3 Total Line" 207T.

(2) Definition of Level 3 Data Group

A group of multiple "Level 2 Data groups" 402 and "Level 3 Total Line" 207T is defined as a "Level 3 Data Group" 403.

(3) Hierarchy of Data Groups

In this way, multiple layers of data groups are structured to form the normalized Report according to the present invention. A line that represents the total values are created for each level of the hierarchy, and such lines are called "Level 3 Total Line" 207T and "Level 4 Total Line" (not shown) and so on in the order of the hierarchy, respectively. And a group of lines that comprise the Total Line for each level is called "Level 3 Data group" and "Level 4 Data group" in the order of hierarchy, respectively.

1.3.1 Numerical Data of the Total Line at Each Level is Structured in the Below Manner.

(1) "Level 1 Total Line" 204T represents the total value of the numerical data in "Detail Lines" 201 in the same "Level 1 Data Group" 401.

(2) "Level 2 Total Line" 205T represents the total value of the numerical data in "Level 1 Total Lines" 204T in the same "Level 2 Data group" 402.

(3) "Level 3 Total Line" 207T represents the total value of the numerical data in "Level 2 Total Lines" 205T in the same "Level 3 Data group" 403.

(4) After Level 3, the Total Line represents the total value of the numerical data in "Total Lines" of a Group that is one level below, in the same manner as discussed above with respect to Level 2 Data Group 402 and Level 3 Data Group 403.

Once the report data structure has been normalized, the present invention provides that in step 510 (see FIG. 5), report based graph definition rules are used that associate elements of the report structure to specific graphs (using specific data items) such that when a user selects an element of the report structure (for example, a total data item), a specific graph is automatically generated based on the report graph generation rule corresponding to that element of the normalized report data structure. Therefore, the following section 2.0 (and its subsections) illustrates how the elements of the normalized report data structure may be identified from a Report.

2.0 Examples of identifying elements of normalized report data structure.

(2.1) Definition of "Total Line"

To define the identifying condition of the "line" comprising data items that denote the total values, and to specify "Total Line name" for that specific Total Line.

(a) "Line identifying condition" may be whether the line comprises "specific characters in the specific columns."

(b) "Total Line name" is defined in one of the following three approaches.

Type 1: To specify a character-string at the specific column position in the specific Total Line, as "Total Line name."

Type 2: To specify a character-string outside the Total Line as "Total Line name." In this case, specify character strings shown in the specific column position in the lines between this Total Line and the last Total Line of the same data group.

Type 3: To specify the fixed character-string as "Total Line name."

This type is appropriate when only one Total Line definition for each hierarchical group is sufficient in one Report.

The following are examples of identifying Total Lines according to this preferred embodiment of the present invention.

Level 1 Total Line

Identifying condition: the line that comprises a character string "Section Total" from column 21.

Total Line name: type 2 (the character-string from column 11 to column 16 in the first line where the first column is not "blank.")

Level 2 Total Line:

Identifying condition: the line that comprises the character "Department total" from column 21.

Total Line name: type 2 (the character-string from column 1 to column 20 in the first line where the first column is not "blank.")

Level 3 Total Line:

Identifying condition: the line that comprises the character "Corporate total" from column 1.

Total Line name: type 1 (the character-string from column 11 to column 25.)

(2.2) Definition of "Detail Line"

To specify the identifying condition of "Detail Line" that comprises numerical data items that together comprise the total value of the Total Line, and to specify "Detail Line names" for respective Detail Lines.

(a) Identifying condition: "Detail Line" is defined in either of the following two approaches.

Type 1: To define by identifying "specific character-string in the specified column" in the same line as the data items.

Type 2: To define by identifying "specific character-string in the specified column" in the line different from where the data items exist. (For example, "Detail Line" can be also specified as given lines before or after the line where "specific character-string" exists in the "specific column."

(b) The character string of the specific column position in the same line where "specific character-string in the specified column" is detected as in the above (a), is specified as "Detail Line name."

(c) Only one Detail Line definition is sufficient for one Report.

The following are some examples of identifying conditions for Detail Lines according to the present invention.

EXAMPLE 1

To define the line where specific characters are comprised in the specific column as the "Detail Line", and to define a character-string that is displayed in the specific position in a line as the "Detail Line name."

"Detail Line" identifying condition: the line that comprises a character "A" from column 21

"Detail Line name": the character-string displayed from column 21 to column 30

EXAMPLE 2

To define the n-th line from the line that comprises "specific characters in the specific column" as the "Detail Line" (e.g. the succeeding line, or 2 lines after), and to define a character-string that is shown at the specific position of the line where "specific characters at the specific columns" exist, as the "Detail Line name."

"Detail Line" identifying condition: the line following the one that comprises a character "X" from column 21

"Detail Line name": character-string displayed from column 21 to column 30

(2.3) Definition of "V Total Items" (to be defined for the "Total Line")

(a) To specify "V Total Item" at the specified column position in the Total Line.

(b) Multiple "V Total Items" can be defined in a single line.

(c) "V Total Item" is common for all levels of Total Lines in Report, so one definition is sufficient for one Report.

(d) The total value that "V Total Item" denotes is the total of the numeric data in the same column position as the specified "V Total Item" in the corresponding "Detail Lines."

The following are some examples of identifying V Total data items according to this preferred embodiment of the present invention.

V Total Item 1: from column 31 to column 40

V Total Item 2; from column 41 to column 50

V Total Item 3: from column 51 to column 60

(2.4) Definition of "H Total Item"

This is a common definition for both "Detail Lines" and "Total Lines," that contain H Total data items. Multiple "H Total Items" can be defined in a single line.

(a) To specify the column position of the numeric data item that denotes the total value of the numerical data within the (same) "Detail Line."

Example

"H Total Item 1": From column 61 to column 70

(b) To specify the column positions of the numerical data items that constitute the total value in the "Detail Line," and to specify the character-strings for "data item names" for respective data items.

Example

In case of "H Total Item 1" that denotes three data items:

Data 1: Data from column 31 to column 40, "Data item name": a character string from column 31 to column 40 in the second line Data 2: Data from column 41 to column 50, "Data item name": a character string from column 41 to column 50 in the second line Data 3: Data from column 51 to column 60, "Data item name": a character string from column 51 to column 60 in the second line (2.5) Definition of "X Total Item"

The data item that is in the same column position as "H Total Item" in a Total Line, is defined as "X Total Item," and can, therefore, be identified by using similar identifying conditions as discussed above with respect to "V Total Item" definition.

Example

"V Total Item": from column 61 to column 70 (in the same column position as "H Total Item")

In steps 510 and 515 (see FIG. 5), in addition to identifying the elements of the normalized report data structure in a Report, the present invention provides that report based graph generation rules are associated with the identified elements of the normalized report data structure. Therefore, once a user selects (or indicates in some manner) one of the elements of the report data structure on a displayed Report (for example on a Report displayed on a computer screen), a graph is automatically generated based on report based graph generation rules, provided by the present invention, that are associated with the selected element of the report data structure. Section 3.0 (and its subsections) provides examples of report based graph generation rules provided according to the present invention.

3.0 Report based Graph Generation Rules (3.1) By applying the above identification of report data structure elements to to all the electronic data in Report that the user desires to show in graphs, the following data is extracted for all "V Total Items" and "H Total Items" that denote the total values in the specific Report]

(I) Data with regard to "V Total Items":

Displayed positions of "V Total Items" in Report (i.e., line number, column number and the number of columns), the "Total Line names" and the line numbers of "Detail Lines" or "Total Lines" of the data that constitutes the total value of "V Total Item."

(II) Data with regard to "H Total Item":

Displayed positions of "H Total Lines" in Report, i.e., line numbers. (Note the displayed column position, the number of columns, and the column position and the number of columns of the data items that constitute the corresponding Total Items, are common for all "H Total Items" in Report.)

(3.2) To display Reports that are subject to graphs on a computer display

"V Total Item," "H Total Item" and "X Total Item" are displayed in a manner so that the user can tell they can be designed with a mouse click. For example, all of these data items can be marked in a different color (or highlighted) so that a user is made aware that these data items can be selected to generate a graph.

When "V Total Item" is displayed in the same column position as "H Total Item," it is displayed as "X Total Item."

(3.3) The Total Item that a user wants to display in graphs can be designated with a mouse click (or any other indicator as would be recognized by one skilled in the art).

(3.4) When a "V Total Item" is designated, the data items in the Detail Line or Total Line, that constitute the total value of the "V Total Item," and the Detail Line names or Total Line name are extracted. Preferably, the designated "V Total Item" is marked or displayed in the color (or by changed color or by highlighting) for easy identification, together with their component data items.

(3.5) When "H Total Item" is designated, the data items in the Detail Line or Total Line, that constitute the total value of "H Total Item" and the data item names are extracted. Preferably, the designated "H Total Item" together with their component data items are marked or displayed in the color for easy identification.

(3.6) When "X Total Item" is designated, "X Total Item" is considered as both "V Total Item" and "H Total Item," and the respective data items together with Total Line name and data item names are extracted in the same manner as described in the above (3.4) and (3.5). Preferably, the designated "X Total Item" and its component data items are displayed in the color for easy identification.

(3.7) "Display graph" can be designated at the window (or any other equivalent display) that displays the Report as described in the above (3.4)–(3.6). When "Display graph" is designated, graphs are created, utilizing the data extracted as in the above (3.4)–(3.6), and are displayed, preferably, in a different window from the Report window.

The format of graphs to be displayed can be predefined (i.e., specified together with the predefined rule which determines the data items to be displayed) or can be provided as an option for the user when "Display graph" is designated as above described with a mouse click (or other equivalent indicating means).

Upon designating "X Total Item," graphs for both "V Total Item" and "H Total Item" are created and displayed. Alternatively, when defining "X Total Item," the user can also specify whether they desire only the graph corresponding to the "V Total Item" or "H Total Item" that coincides with the X Total Item.

(3.8) By designating parts of the graph at the windows in the above (3.7) with a mouse click (or equivalent indicating means), the "Original Report(s)" or "Table of data items corresponding to the created graph" can be easily displayed by means of a standard link or association to that table. Such component data can be also extracted in the normalized report data format and stored in a desired file for future use.

Figure 9:
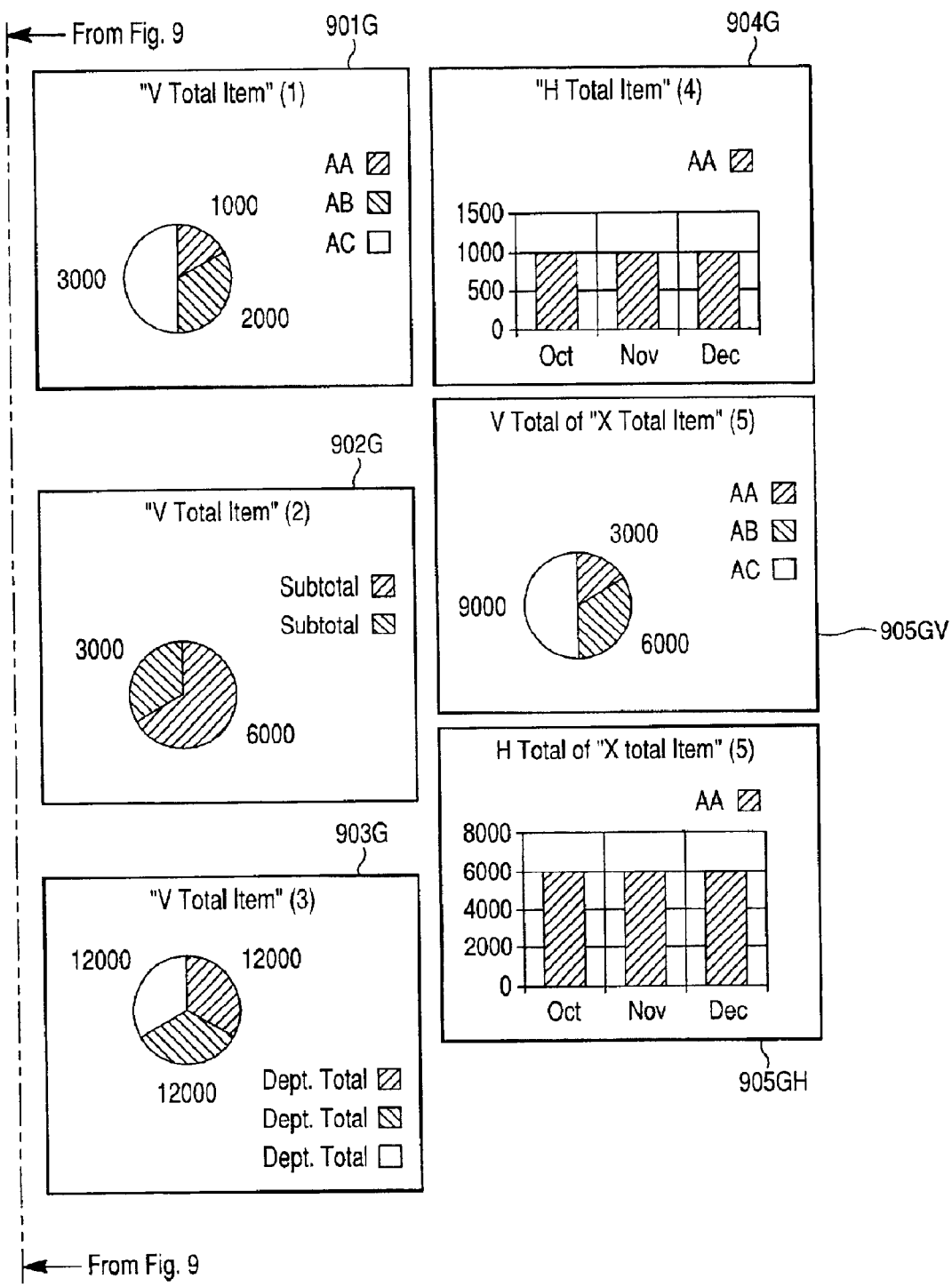
FIG. 9 is diagram illustrating one example of graphs created in accordance with the present invention.

FIG. 9 illustrates graphs generated based on report based graph generation rules associated with the selection of normalized report data elements according to the present invention.

(a) When "V Total Item" 901 is designated:

This is "V Total Item" in the first Level 1 Total Line, so the Detail Lines from the top of the Report to the one just before this Total Line, are subject to computation. By designating "V Total Item" with a mouse click (or the like), the data items of the same column position as the "designated V Total Item" in the subject Detail Line are extracted as follows:

Name of the Total Line: "Section 1"

Name of Detail Line "AA," numerical data item "1000"

Name of Detail Line "AB," numerical data item "2000", and

Name of Detail Line "AC," numerical data item "3000".

From this selected set of data a graph that shows the elements of the sum of "Section 1" is displayed as shown by 901G.

(b) When "V Total Item" 902 is designated:

This is "V Total Item" in Level 2 Total Line (i.e. the line that shows "Department total" of Yokohama Sales Dept.), so Level 1 Total Lines between the last Level 2 Total Line and designated Level 2 Total Line, are subject to computation.

The data items in the same column position as the designated V Total Item in the subject Level 1 Total Line, are extracted, as follows:

Name of the Total Line: Yokohama Sales Dept.

Name of the Total Line: "Sec. 1,"numerical data item "6000", and

Name of the Total Line: "Sec. 2,"numerical data item "3000".

From this selected set of data, a graph that shows the elements of the total of "Yokohama Sales Dept." is displayed as shown by 902G.

(c) When the "V Total Item" 903 is designated:

This is a V Total Item in the Level 3 Total Line (i.e., the Corporate Total). Therefore, data items extracted are as follows:

Name of Level 3 Total Line: Corporate Total

Name of Level 2 Total Line: Tokyo Sales Department with numerical value 12000.

Name of Level 2 Total Line: Yokohama Sales Department with numerical value 9000.

Name of Level 2 Total Line: Osaka Sales Department with numerical value 12000.

From this selected set of data, a graph that shows elements of the Corporate Total is displayed as shown by 903G.

(d) When "H Total Item" 904 is designated.

The following data is extracted from this Detail Line.

Name of Detail Line: "AA",

Name of data item: "Oct.", numerical data item "1000",

Name of data item: "Nov.", numerical data item "1000", and

Name of data item: "Dec.", numerical data item "1000".

From this selected set of data, a graph that shows the percentage of each element of the total of "AA" is displayed as shown in 904G.

(e) When "X Total Item" 905 is designated:

Both types of "V Total item" and "H Total Item" processing are carried out.

In accordance with rules built in "V Total Item," the following data is extracted from Report.

Name of the Total Line: "Section 1",

Name of Detail Line: "AA", numerical data item "3000",

Name of Detail Line: "AB", numerical data item "6000", and

Name of Detail Line: "AC", numerical data item "9000".

From this selected set of data, a graph is displayed that shows the elements of the total sales of Section 1 by the product as shown by 905GV.

In accordance with rules built in "H Total Item", the following data is extracted from Report.

Name of Total Line: "Section 1"

Name of data item: "Oct.", numerical data item "6000",

Name of data item: "Nov.", numerical data item "6000", and

Name of data item: "Dec.", numerical data item "6000".

From this selected set of data, a graph is displayed that shows the monthly sales totals of Section 1 by the month as shown by 905GH.

FIG. 10 shows a graph generated according to the rules of the present invention that show the transition of data among multiple Reports The present invention provides that if the same Report Graph Definition Rule is applied to Reports that are repeatedly created, for example on a monthly basis, for example, "V Total Items" of the same "Total Line name" or of the same column position, are considered as the same data items. For example, when Reports that shows monthly sales data are created monthly, "V Total Item" denotes the total value of the same division of each month's Report.

When Reports are repeatedly created on a monthly basis, for example, and are managed by generation, the same Report Graph Definition Rule is applied to Reports of respective generations, and the user can extract the numerical data that denotes the same "V Total Item" from each generation of Report.

By designating a "V Total Item" to specify "deviation/fluctuation data processing over multiple generations," as one of the Report Graph Definition Rules, the corresponding data from related Reports is extracted by the above described processing, a time-series graph that shows the deviation of data over multiple Reports, or a graph that shows the values compared to the previous period(s) can be created and shown in a separate windows screen.

Therefore, in FIG. 10, 1010–1014 are three monthly sales reports for the same departments. If the Level 2 Total Item 1001 is clicked (or otherwise indicated), the present invention provides that a graph 1001 G is generated that displays the same department total for the last three months by extracting the equivalent data from each of the three monthly sales reports 1010. Likewise, when the Level 2 Total Item 1002 is clicked (or otherwise indicated), the present invention provides that a graph 1002G is generated that extracts equivalent data from each of the three monthly sales reports 1010–1014.

In one aspect of the present invention, if any part of such time series graphs is clicked with a mouse, in the respective windows screen, the data that constitutes the graphs can be displayed in a table format. The data can be also extracted in normalized format and the like, to be stored in a desired file for future use.

Alternatively, in a situation where the report page is no longer displayed, if a feature of a graph is clicked, then the pertinent report page or section or division may be displayed on which the data items reside that were used to create the graph. Alternatively, only the report page number might be displayed after the graph feature is clicked. Note that the display of the pertinent report page or section or division or page may be accomplished by standard association techniques as would be appreciated by those skilled in the art.

Some of the advantages provided by the present invention include:

(1) Uses Reports as the data source, so there is no need to re-enter data;

(2) The user can create desired graphs with very simple operations;

(3) The user can create trend (transition) graphs by utilizing the past data stored in time-sequence, together with the present data;

(4) The user can specify data to automatically create graphs from regularly and repeatedly outputted Reports; and (5) Alteration or tampering of data can be prevented, as the fixed output Reports are used as the direct data source.

Other embodiments of the invention will be apparent to those skilled in the art from a consideration of the specification and the practice of the invention disclosed herein. It is intended that the specification be considered as exemplary only, with all equivalent embodiments to those disclosed herein being considered as a part of the present invention. Furthermore, the claims attached hereto define aspects of the invention and do not limit the present invention which includes all embodiments that would be apparent to those skilled in the art from the complete disclosure of the present application including all of its claims.

What is claimed is:

1. A computer implemented method of automatically generating, in an application, a graph from report data derived from a previous report created by a different application, the method comprising the steps of:

identifying a report format as comprising at least one first group at a first level having at least one detail line with at least two data fields in each of the detail lines, wherein the first group further includes either a vertical total for each of a plurality of the respective data fields in the first group or a horizontal total for each of a plurality of the respective detail lines, with each particular vertical total totaling a corresponding data field for each detail line and with each particular horizontal total totaling each of the data fields for that particular detail line;

receiving a user input indicative of one of the totals; and generating a graph using a predefined rule corresponding to the one of the totals indicated by the user input, wherein the report format is hierarchical and further comprises a second group at a second level, each second group comprising one or more first groups, the second group including second group vertical totals, each second group vertical total aggregating all vertical totals for that data field for each first group in the second group, and wherein report data comprises data from the previous report created by the different application and the report data does not include any previous data used to create the previous report, and wherein the predefined rule for generating a graph is derived from the identified report format of the previous report created by the different application.

2. The computer implemented method according to claim 1, wherein the predefined rule corresponding to a particular one of the vertical totals includes using each different value that formed that particular vertical total to form a different feature in said graph.

3. The computer implemented method according to claim 1, wherein the predefined rule corresponding to particular one of the horizontal totals includes using each different value that formed that particular detail line total to form a different feature in said graph.

4. The computer implemented method according to claim 2, wherein each different feature is a separate display component in said graph displayed on a graphical display.

5. The computer implemented method according to claim 3, wherein each different feature is a separate display component in said graph displayed on a graphical display.

6. The computer implemented method according to claim 1, wherein both vertical totals and horizontal totals are included in the previous report.

7. The computer implemented method according to claim 6, wherein the report format further comprises a cross total field that equals either the sum of the vertical totals or the sum of the horizontal totals.

8. The computer implemented method according to claim 7, further comprising:

receiving a user input indicative of one cross total field; and generating a graph using a predefined rule corresponding to that one cross total field.

9. The computer implemented method according to claim 8, wherein the predefined rule corresponding to that one cross total field includes forming a different feature in said graph corresponding to either each vertical total or each horizontal total that formed said cross total field.

10. The computer implemented method as defined in claim 9, wherein the predefined rule corresponding to that one cross total field includes forming a first and a second graphs, with a different feature in said first graph corresponding to each vertical total that formed said cross total field and with a different feature in said second graph corresponding to each horizontal total that formed said cross total field.

11. The computer implemented method according to claim 1, wherein the second group vertical totals are formed in a line.

12. The computer implemented method according to claim 1, further comprising:

receiving a user input indicative of one of the second group vertical totals; and generating a graph using a predefined rule corresponding to that one of the second group vertical totals.

13. The computer implemented method according to claim 12, wherein the predefined rule corresponding to a particular one of the second group vertical totals includes using each different first group vertical total that formed that second group vertical total to form a separate feature on said graph.

14. The computer implemented method according to claim 1, wherein each second group comprises at least two first groups.

15. The computer implemented method according to claim 1, wherein the hierarchical report format further comprises a third group at a third level, each third group comprising one or more second groups, the third group including respective third group vertical totals, each third group vertical total aggregating all second group totals for that data field for each second group in the third group.

16. The computer implemented method according to claim 15, wherein the third group vertical totals are formed in a line, and further comprising:

receiving a user input indicative of one of the third group vertical totals; and generating a graph using a predefined rule corresponding to that one of the third group vertical totals.

17. The computer implemented method according to claim 15, wherein the predefined rule corresponding to a particular one of the third group vertical totals includes using each second group vertical total that formed that third group vertical total to form a separate feature on said graph.

18. The computer implemented method according to claim 1, wherein the received user input comprises clicking on a total.

19. The computer implemented method according to in claim 1, wherein the received user input comprises clicking on a total area that is of a different color than other areas.

20. A computer implemented method of automatically generating, in an application, a graph from report data derived from a previous report created by a different application, the method comprising the steps of:
   identifying a report format as comprising at least one first group at a first level having at least one detail line with at least two data fields in each of the detail lines, wherein the first group further includes either a vertical total for each of a plurality of the respective data fields in the first group or a horizontal total for each of a plurality of the respective detail lines, with each particular vertical total totaling a corresponding data field for each detail line and with each particular horizontal total totaling each of the data fields for that particular detail line;
   receiving a user input indicative of one of the totals; and
   generating a graph using a predefined rule corresponding to the one of the totals indicated by the user input,
   wherein the predefined rule corresponding to a particular one of the vertical totals includes using each different value that formed that particular vertical total to form a different feature in said graph, and
   wherein each of a plurality of the different features in said graph is linked to the corresponding different value used to form that feature, and wherein clicking on a feature displays the linked corresponding different value, and
   wherein report data comprises data from previous report created by the different application and the report data does not include any previous data used to create the previous report, and wherein the predefined rule for generating a graph is derived from the identified report format of the previous report created by the different application.

21. The A computer implemented method of automatically generating, in an application, a graph from report data derived from a previous report created by a different application, the method comprising the steps of:
   identifying a report format as comprising at least one first group at a first level having at least one detail line with at least two data fields in each of the detail lines, wherein the first group further includes either a vertical total for each of a plurality of the respective data fields in the first group or a horizontal total for each of a plurality of the respective detail lines, with each particular vertical total totaling a corresponding data field for each detail line and with each particular horizontal total totaling each of the data fields for that particular detail line;
   receiving a user input indicative of one of the totals; and
   generating a graph using a predefined rule corresponding to the one of the totals indicated by the user input,
   wherein the predefined rule corresponding to particular one of the horizontal totals includes using each different value that formed that particular detail line total to form a different feature in said graph, and
   wherein each of a plurality of the different features in said graph is linked to the corresponding different value used to form that feature, and wherein clicking on a feature displays the linked corresponding different value, and
   wherein report data comprises data from the previous report created by the different application and the report data does not include any previous data used to create the previous report, and wherein the predefined rule for generating a graph is derived from the identified report format of the previous report created by the different application.

22. The computer implemented method according to claim 20, wherein when a feature designation is received from a user, the report page containing the different value used to form that feature is displayed, and
   wherein the step of generating a graph comprises using the identified report format to automatically identify the underlying report data corresponding to the one of the totals indicated by the user and using the automatically identified underlying report data to generate the graph.

23. The computer implemented method according to claim 22, wherein when the report page is displayed after receiving a designation of a feature, at least one value used to form the feature is displayed in a different manner relative to the other values on the report page.

24. The computer implemented method according to claim 20, wherein when the report page is displayed after receiving a designation of a feature, links to other pages used to form the feature are included in the display.

25. The computer implemented method according to claim 2, wherein when a feature in said graph is designated, a report page number containing the value used to form the designated feature is displayed.

26. The computer implemented method according to claim 1, wherein the column location of vertical totals determines the column location of the data fields of all detail lines.

27. The computer implemented method according to claim 15, wherein predetermined control break characters define the location of the first and any other subsequent hierarchical groups.

28. In a computer display system that displays a graph, in an application, corresponding to report data derived from a previous report created by a different application, a method of displaying graph components comprising the steps of:
   generating graph components corresponding to an identified report format comprising a first group at a first level having plural detail lines each having plural data fields and having either respective vertical total fields for each data field that totals that data field's values in each of the detail lines or respective horizontal total fields for each detail line that totals all the data fields in one detail line;
   highlighting either the vertical total fields or the horizontal total fields;
   accepting user input only in the highlighted vertical total fields or the horizontal total fields; and
   generating a graph based on user input in one of the highlighted vertical total fields or the horizontal total fields,
   wherein the report format is hierarchical and further comprises a second group at a second level, each second group comprising one or more first groups, the second group including second group vertical totals, each second group vertical total aggregating all vertical totals for that data field for each first group in the second group, and wherein report data comprises data from the previous report created by the different application and the report data does not include any previous data used to create the previous report, and wherein a predefined rule for generating a graph is derived from the identified report format of the previous report created by the different application.

29. A computer readable data storage medium having program code recorded thereon, that when executed, causes a computing system to automatically generate, in an application, a graph from report data derived from a previous report created by a different application, the program code comprising:

a first program code that identifies a report format as comprising at least one first group at a first level having at least one detail line with at least two data fields in each of the detail lines, wherein the first group further includes either a vertical total line for each of a plurality of the respective data fields in the first group or a horizontal total for each of the plurality of the detail lines, with each particular horizontal total totaling each of the data fields for that particular detail line;

a second program code that receives user input indicative of one of the totals; and a third program code that generates a graph using a predetermined rule corresponding to the one of the totals indicated by the user input, wherein the report format is hierarchical and further comprises a second group at a second level, each second group comprising one or more first groups, the second group including second group vertical totals, each second group vertical total aggregating all vertical totals for that data field for each first group in the second group, and wherein report data comprises data from the previous report created by the different application and the report data does not include any previous data used to create the previous report, and wherein the predefined rule for generating a graph is derived from the identified report format of the previous report created by the different application.

30. The computer readable data storage medium according to claim 29, wherein the vertical totals are formed in a vertical total line.

31. The computer readable data storage medium according to claim 29, wherein the predefined rule corresponding to a particular one of the vertical totals includes using each different value that formed that particular vertical total to form a different feature in said graph.

32. The computer readable data storage medium according to claim 29, wherein the predefined rule corresponding to a particular one of the horizontal totals includes using each different value that formed that particular detail line total to form a different feature in said graph.

33. The computer readable data storage medium according to claim 31, wherein each different feature is a separate display component in said graph displayed on a graphical display.

34. The computer readable data storage medium according to claim 32, wherein each different feature is a separate display component in said graph displayed on a graphical display.

35. The computer readable data storage medium according to claim 29, wherein both vertical and horizontal totals are included in the previous report.

36. The computer readable data storage medium according to claim 35, wherein the report format further comprises a cross total field that equals either the sum of the vertical totals or the sum of the horizontal totals.

37. The computer readable data storage medium according to claim 36, wherein the second program code receives a user input indicative of one cross total field, and wherein said third program code generates a graph using a predefined rule corresponding to that one cross total field.

38. The computer readable data storage medium according to claim 37, wherein the predefined rule corresponding to that one cross total field includes forming a different feature in said graph corresponding to either each vertical total or each horizontal total that formed said cross total field.

39. The computer readable data storage medium according to claim 38, wherein the predefined rule corresponding to that one cross total field includes forming a first and second graphs, with a different feature in said first graph corresponding to each vertical total that formed said cross total field and with a different feature in said second graph corresponding to each horizontal total that formed said cross total field.

40. The computer readable data storage medium according to claim 29, wherein the second group vertical totals are formed in a line.

41. The computer readable data storage medium according to claims 29, wherein the second program code is programmed to receive a user input indicative of one of the second group vertical totals, and the third program code is programmed to generate a graph using a predefined rule corresponding to that one of the second group vertical totals.

42. The computer readable data storage medium according to claim 41, wherein the predefined rule corresponding to a particular one of the second group vertical totals includes using each different first group vertical total that formed that second group vertical total to form a separate feature on said graph.

43. The computer readable data storage medium according to claim 29, wherein each second group comprises at least two first groups.

44. The computer readable data storage medium according to claim 29, wherein the hierarchical report format further comprises a third group at a third level, each third group comprising one or more second groups, the third group including respective third group vertical totals, each third group vertical total aggregating all second group totals for that data field for each second group in the third group.

45. The computer readable data storage medium according to claim 44, wherein the third group vertical totals are formed in a line, and wherein the second program code is programmed to receive a user input indicative of one of the third group vertical totals; and the third program code generates a graph using a predefined rule corresponding to that one of the third group vertical totals.

46. The computer readable data storage medium according to claim 44, wherein the predefined rule corresponding to a particular one of the third group vertical totals includes using each second group vertical total that formed that third group vertical total to form a separate feature on said graph.

47. The computer readable data storage medium according to claim 29, wherein the received user input comprises clicking on a total.

48. The computer readable data storage medium according to claim 29, wherein the received user input comprises clicking on a total area that if of different color that other areas.

49. A computer readable data storage medium having program code recorded thereon for automatically generating, in an application, a graph from report data derived from a previous report created by a different application, the program code comprising:
- a first program code that identifies a report format as comprising at least one first group at a first level having at least one detail line with at least two data fields in each of the detail lines, wherein the first group further includes either a vertical total line for each of a plurality of the respective data fields in the first group or a horizontal total for each of the plurality of the detail lines, with each particular horizontal total totaling each of the data fields for that particular detail line;
- a second program code that receives user input indicative of one of the totals; and
- a third program code that generates a graph using a predefined rule corresponding to the one of the totals indicated by the user input,
- wherein the predefined rule corresponding to a particular one of the vertical totals includes using each different value that formed that particular vertical total to form a different feature in said graph,
- wherein each of a plurality of the different features in said graph is linked to the corresponding different value used to form that feature, and wherein clicking on a feature displays the linked corresponding different value, and
- wherein report data comprises data from the previous report created by the different application and the report data does not include any previous data used to create the previous report, and wherein the predefined rule for generating a graph is derived from the identified report format of the previous report created by the different application.

50. A computer readable data storage medium having program code recorded thereon for automatically generating, in an application, a graph from report data derived from a previous report created by a different application, the program code comprising:
- a first program code that identifies a report format as comprising at least one first group at a first level having at least one detail line with at least two data fields in each of the detail lines, wherein the first group further includes either a vertical total line for each of a plurality of the respective data fields in the first group or a horizontal total for each of the plurality of the detail lines, with each particular horizontal total totaling each of the data fields for that particular detail line;
- a second program code that receives user input indicative of one of the totals; and
- a third program code that generates a graph using a predefined rule corresponding to the one of the totals indicated by the user input,
- wherein the predefined rule corresponding to a particular one of the horizontal totals includes using each different value that formed that particular detail line total to form a different feature in said graph,
- wherein each of a plurality of the different features in said graph is linked to the corresponding different value used to form that feature, and wherein clicking on a feature displays the linked corresponding different value, and
- wherein report data comprises data from the previous report created by the different application and the report data does not include any previous data used to create the previous report, and wherein the predefined rule for generating a graph is derived from the identified report format of the previous report created by the different application.

51. The computer readable data storage medium according to claim 49, wherein when a feature designation is received from a user, the report page containing the different value used to form that feature is displayed.

52. The computer readable data storage medium according to claim 51, wherein when the report page is displayed after receiving a designation of a feature, at least one value used to form the feature is displayed in a different manner relative to other values on the report page.

53. The computer readable data storage medium according to claim 49, wherein when the report page is displayed after receiving a designation of a feature, links to other pages used to form the feature are included in the display.

54. The computer readable data storage medium according to claim 31, wherein when a feature in said graph is designated, a report page number containing the value used to form the designated feature is displayed.

55. The computer readable data storage medium according to claim 29, wherein the column location of vertical totals determines the column location of the data fields of all detail lines.

56. The computer readable data storage medium according to claim 29, wherein predetermined control break characters define the location of the first and any subsequent hierarchical groups.

57. A system for automatically generating, in an application, a graph from report data derived from a previous report created by a different application, the system comprising:
- means for identifying and normalizing a report format as comprising at least one first group at a first level having at least one detail line with at least two data fields in each of the detail lines, wherein the first group further includes either a vertical total line for each of a plurality of the respective data fields in the first group or a horizontal total for each of the plurality of the detail lines, with each particular horizontal total totaling each of the data fields for that particular detail line;
- user interaction means for receives a user input indicative of one of the total; and
- a graph generator means for generating a graph by using a predefined rule corresponding to one of the totals indicated by the user input,
- wherein the report format is hierarchical and further comprises a second group at a second level, each second group comprising one or more first groups, the second group including second group vertical totals, each second group vertical total aggregating all vertical totals for that data field for each first group in the second group, and
- wherein report data comprises data from the previous report created by the different application and the report data does not include any previous data used to create the previous report, and wherein the predefined rule for generating a graph is derived from the identified report format of the previous report created by the different application.

58. A system for automatically generating a graph, in an application, from report data derived from a previous report created by a different application, the system comprising:

a report unit that identifies a report format as comprising at least one first group at a first level having at least one detail line with at least two data fields in each of the detail lines, wherein the first group further includes either a vertical total line for each of a plurality of the respective data fields in the first group or a horizontal total for each of the plurality of the detail lines, with each particular horizontal total totaling each of the data fields for that particular detail line;

a user interaction unit that receives a user input indicative of one of the total; and a graph generator that generates a graph by using a predefined rule corresponding to one of the totals indicated by the user input, wherein the report format is hierarchical and further comprises a second group at a second level, each second group comprising one or more first groups, the second group including second group vertical totals, each second group vertical total aggregating all vertical totals for that data field for each first group in the second group, wherein report data comprises data from the previous report created by the different application and the report data does not include any previous data used to create the previous report, and wherein the predefined rule for generating a graph is derived from the identified report format of the previous report created by the different application.

59. The computer implemented method according to claim 1, further comprising:

highlighting or changing in color the one of the totals indicated by the user input; and highlighting or changing in color data components that comprise the one of the totals indicated by the user input.

60. The computer implemented method of automatically generating, in an application, a graph from report data derived from a previous report created by a different application, the method comprising the steps of:

identifying a report format as comprising at least one first group at a first level having at least one detail line with at least two data fields in each of the detail lines, wherein the first group further includes either a vertical total for each of a plurality of the respective data fields in the first group or a horizontal total for each of a plurality of the respective detail lines, with each particular vertical total totaling a corresponding data field for each detail line and with each particular horizontal total totaling each of the data fields for that particular detail line;

receiving a user input indicative of one of the totals; and generating a graph using a predefined rule corresponding to the one of the totals indicated by the user input, wherein the step of generating a graph comprises:
  extracting corresponding data for the one of the totals from a series of reports; and
  generating a graph displaying a different feature for each of the extracted corresponding data, and wherein report data comprises data from the previous report created by the different application and the report data does not include any previous data used to create the previous report, and wherein the predefined rule for generating a graph is derived from the identified report format of the previous report created by the different application.

61. The computer implemented method according to claim 60, wherein the series of reports represents a time series of a particular report.

\* \* \* \* \*